US008432640B2

(12) United States Patent
Fasen et al.

(10) Patent No.: US 8,432,640 B2
(45) Date of Patent: Apr. 30, 2013

(54) TAPE DRIVE HAVING A FLANGELESS ROLLER

(75) Inventors: Donald Fasen, Boise, ID (US); Robert C. Aaron, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 12/968,602

(22) Filed: Dec. 15, 2010

(65) Prior Publication Data

US 2012/0154950 A1  Jun. 21, 2012

(51) Int. Cl.
G11B 15/43 (2006.01)
G11B 15/60 (2006.01)

(52) U.S. Cl.
USPC ................................... 360/130.21

(58) Field of Classification Search ............... 360/130.2, 360/130.21, 130.3, 130.31, 130.32, 85, 93, 360/95, 96.1
See application file for complete search history.

(56) References Cited

U.S. PATENT DOCUMENTS

| 5,909,335 | A | * | 6/1999 | Hardeng et al. | 360/74.2 |
| 6,754,033 | B1 | | 6/2004 | Argumedo et al. | |
| 7,325,763 | B1 | | 2/2008 | Argumedo et al. | |
| 2006/0256465 | A1 | * | 11/2006 | Biskeborn | 360/71 |
| 2009/0122446 | A1 | | 5/2009 | Johnson et al. | |
| 2009/0201609 | A1 | * | 8/2009 | Argumedo et al. | 360/130.21 |
| 2010/0214690 | A1 | * | 8/2010 | Eleftheriou et al. | 360/77.12 |

OTHER PUBLICATIONS

Childers, E.R., et al. Six orders of magnitude in linear tape technology the one-terabyte project, IBM J. Res. & Dev., vol. 47, No. 4, Jul. 2003, 12 pps.

* cited by examiner

*Primary Examiner* — Jefferson Evans

(57) ABSTRACT

A tape drive comprising a head configured to read data from a tape and to write data to the tape, a pair of flanged guide rollers arranged one on either side of the head to guide the tape longitudinally over the head, and a flangeless inertial roller arranged between a flanged guide roller and the head to add inertia to the tape so as to limit speed and movement of the tape as it passes over the head.

17 Claims, 5 Drawing Sheets

TAPE DRIVE HAVING A FLANGELESS ROLLER

BACKGROUND

Data can be recorded on and read from a moving magnetic tape with a magnetic read/write head positioned next to the tape. The magnetic "head" may be a single head or a series of read/write head elements stacked individually and/or in pairs within the head unit. Data is typically recorded in tracks on the tape by moving the tape lengthwise past the head. The head elements are selectively activated by electric currents representing the information to be recorded on the tape. The information is read from the tape by moving the tape longitudinally past the head elements. Magnetic flux patterns on the tape create electric signals in the head elements as the tape moves along. These signals represent the information stored on the tape.

Typically, data is recorded on or read from each of the parallel tracks on the tape by positioning the head elements at different locations across the tape. Head elements are moved from track to track either to record or to read the desired information. A head position actuator operatively coupled to servo control circuitry can control movement of the head according to servo information recorded on the tape.

Servo circuitry is able to position a head with respect to a tape if the lateral position of the tape is suitably restricted. Tape guides (or rollers) with flanges often are used to restrict the position of the tape. However, flanges can cause very rapid tape motion across the tape (laterally) and down the length of the tape (longitudinally) when the tape edge gets caught on a flange or on a surface imperfection thereof. Flanges can also cause excessive wear on the edge of the tape. Conversely, the sharp edges of the tape can, over time, cause excessive wear on the flange, itself. The tape sometimes curls at the edges when it touches the flange. This curling further destabilizes the lateral position of the tape.

BRIEF DESCRIPTION OF THE DRAWINGS

Several examples will hereinafter be described in conjunction with the appended drawings and figures, which together illustrate, by way of example only, features of the present disclosure, and wherein.

DETAILED DESCRIPTION

Figure 1:
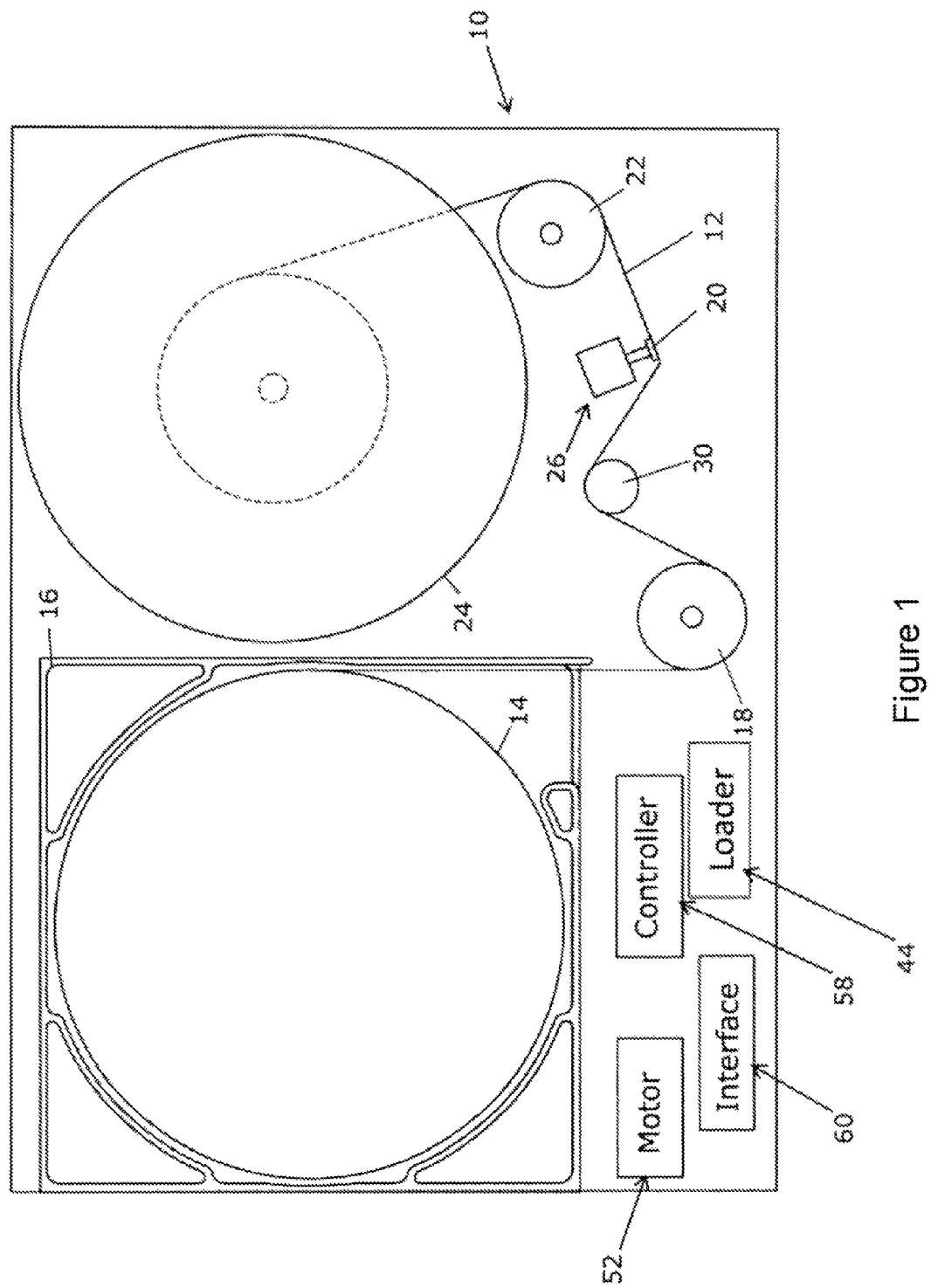
FIG. 1 is a schematic diagram of the configuration of a tape drive according to an example.

FIG. 1 is a schematic diagram of the configuration of a tape drive 10 such as a drive typical of those used with single spool tape cartridges for example. A magnetic tape 12 is wound on a single supply spool 14 in a tape cartridge 16. Tape cartridge 16 is inserted into tape drive 10 for read and write operations. A loader 44 of the tape drive 10 may facilitate insertion of the tape cartridge 16 into the tape drive 10. When the tape cartridge 16 is inserted into the tape drive 10, the drive 10 may grab a leader of the tape 12 to pull the tape 12. Within the tape drive 10, the head assembly 26 engages the magnetic tape 12.

Tape 12 passes around a first tape guide 18, over a magnetic read/write head 20 and around a second tape guide 22 to a take up spool 24. Head 20 is mounted to a carriage and actuator head assembly 26 that positions head 20 over the desired track or tracks on tape 12. Head 20 engages tape 12 as tape 12 moves across the face of head 20 to record data on tape 12 and to read data from tape 12.

A first tape guide 18 and a second tape guide 22 (e.g., rollers) disposed separately from the head assembly 20 facilitate serial movement of the magnetic tape 12 through the tape drive 10 and onto a take-up spool 24 of the tape drive 10. In addition, a motor 52 of the tape drive 10 may provide a motive force for the serial movement of the tape 12 through the tape drive 10 and around components of the tape drive 10. A controller 58 of the tape drive 10 may direct or determine the serial movement of the tape 12 as well as movement of the head 20. The controller 58 may be hardware, software in the form of machine readable instructions, or a combination. According to an example, the controller 58 may be external to the tape drive 10. For example, the controller 58 may be located within another part of a computer system in which tape drive 10 is present, such as the system described below with reference to figure for example.

The tape drive 10 may also include an interface 60 to allow the tape drive 10 to interface with a computer system. According to an example, the controller 58 may receive data from a computer system to be stored on magnetic tape 12 through the interface 60. The controller 58 may then direct head 20 to write the data to the magnetic tape 12, and to determine the position of the tape 12 when the tape 12 is later read.

Typically, linear tape products such as those described above with reference to FIG. 1 use closed loop head positioning based on servo patterns written on the tape 12. This enables a high data track density and capacity on each tape cartridge 16 (currently of the order of 3TB uncompressed for example). When moving the head 20 laterally across the tape 12 to follow the servo pattern track position on the tape 12, the tape 12 can move due to frictional coupling between the head 20 and tape 12. This head-tape coupling can lead to an unstable or reduced stability head position in the control loop. In particular, high levels of head-tape frictional coupling can reduce the phase margin in the head positioning control loop.

Further, as the linear data density of tape 12 is increased, the smoothness of the media increases. That is, as the bits get smaller to allow higher capacity, the tape's magnetic layer is made smoother to ensure that a close proximity between the magnetic layer of the tape 12 and the read-write elements in the head 20 is maintained, as well to reduce the spacing loss at high linear density. This smooth media can cause further phase loss due to high levels of head-tape coupling and rapid tape speed variations due to the smooth media sticking to the head 20. Such rapid tape motions are possible because of the low mass of the free section of tape over the head 20 between the two rollers 18, 22 in the drive 10.

According to an example, the addition of a flangeless roller near head 20 that is tightly coupled to the tape 12 adds inertia from the roller to that of the tape 12 thereby limiting the speed and range of tape motion. This reduces the lateral motion of the tape 12 in response to head motion and the rapid longitudinal or speed variations of the tape 12. Additionally, rapid lateral tape motion (LTM) from reel or roller flange hits is slowed down and limited in range due to inertia added to the tape by the roller. Slowing such lateral and longitudinal tape motions allows the bandwidth of the head positioning control loop to follow these motions, eliminating the tracking errors from these motions and allowing higher track density and greater reliability. According to an example, a flangeless roller can include a surface treatment and/or wrap-angle to cause a tight coupling between the roller and tape 12. One form of surface treatment is to add circumferential grooves to the inertial roller. Accordingly, the inertia of this roller acts to slow down and limit the lateral and longitudinal tape motions. Alternatively, the material from which the roller is fabricated, or a surface treatment or material of the roller, can be selected or provided to cause a tight coupling.

Figure 2:
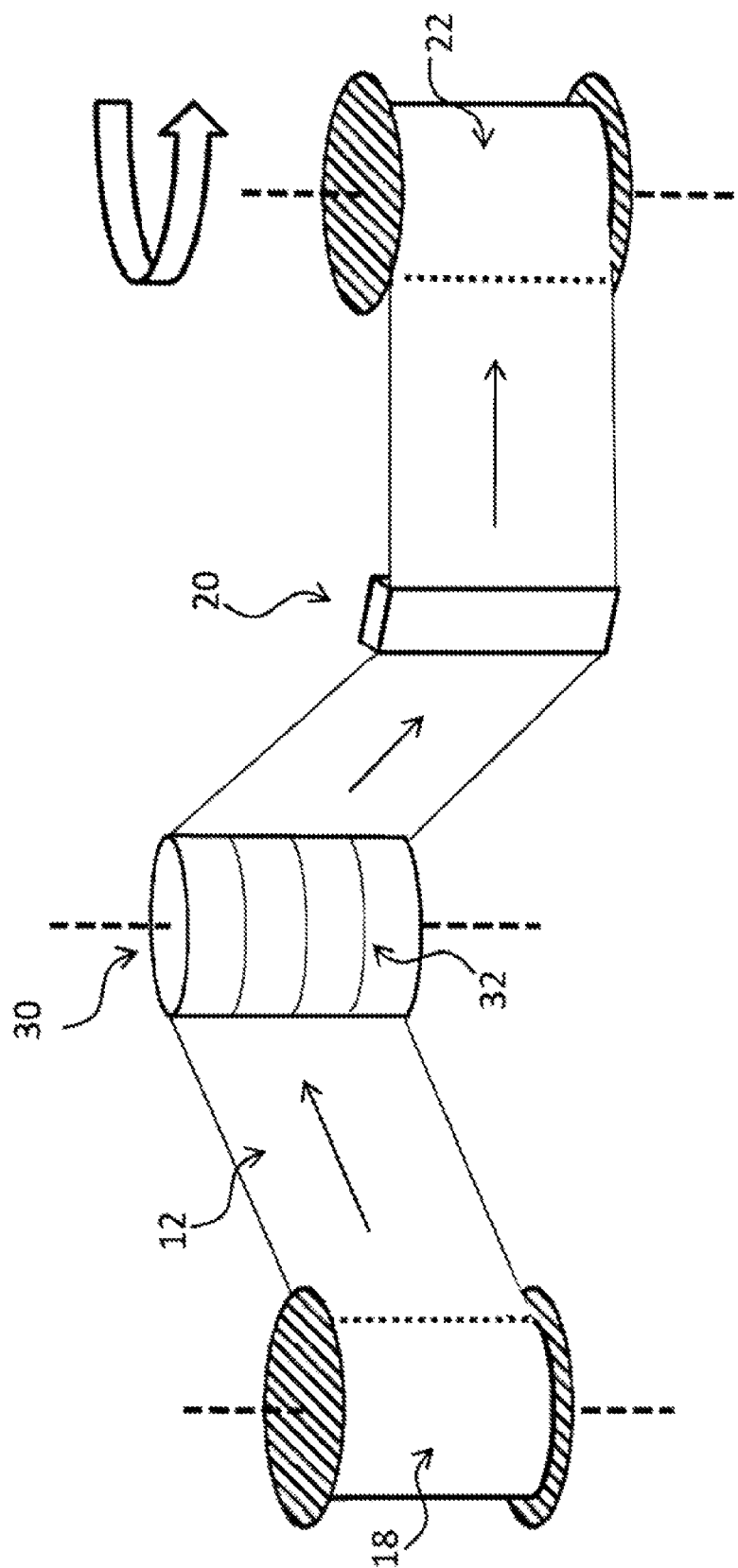
FIG. 2 is a schematic block diagram of a tape drive guide arrangement according to an example.

FIG. 2 is a schematic block diagram of a tape drive guide arrangement according to an example. The arrangement forms part of the tape drive 10. Tape 12 passes around a first tape guide 18, over a magnetic read/write head 20 and around a second tape guide 22. Guides 18, 22 can include upper and lower flanges depicted by hashed areas of guide rollers 18, 22. A flangeless inertial roller 30 is provided in the tape drive guide. According to an example, inertial roller 30 is arranged between roller 18 and head 20 with tape 12 passing behind roller 30. Roller 30 can alternatively be arranged between head 20 and roller 22 with tape 12 passing behind roller 30.

As the tape 12 is pulled over the roller 30, a film of air is created between the outside surface of the roller 30 and tape 12. This film is often referred to as an air bearing. Such a bearing can be reduced by the provision of multiple grooves 32 in roller 30, or a spiral groove extending around the periphery of the roller 30. The grooves can be circumferential, spiral, partially circumferential or any combination for example. The provision of the grooves reduces the air bearing and thereby increases the friction between the tape 12 and the roller 30 to slow lateral movement of the tape as well as unwanted longitudinal movements as described above. According to an example grooves can be V-shaped having a width substantially in the range of 0.2 mm to 0.6 m and a depth substantially in the range of 0.1 mm to 0.3 mm. Other alternative arrangements for a groove or grooves are possible, such as alternative shapes as are typical of such arrangements. According to an example, a groove or groves can be replaced with other texturing or surface features of the roller. For example, the roller can include multiple indentations, such as spherical indentations.

The wrap-angle induced by roller 30 maintains tape contact with the roller 30. Such a wrap-angle can be used with no other measures to reduce an air bearing between the tape 12 and roller 30. Alternatively, a suitable wrap angle in combination with grooves (or a groove or other measures as described) 32 can provide additional tape contact to provide inertia to nullify unwanted tape movements. According to an example, a wrap angle is the cumulative angular contact of the tape 12 against the roller 30. Accordingly, a larger wrap angle gives rise to a larger proportion of the tape 12 which is in contact with roller 30. A wrap angle can be tuned to ensure that tape 12 fits in a tape path of the drive, and adjusted to frequencies which are to be damped.

Figure 3:
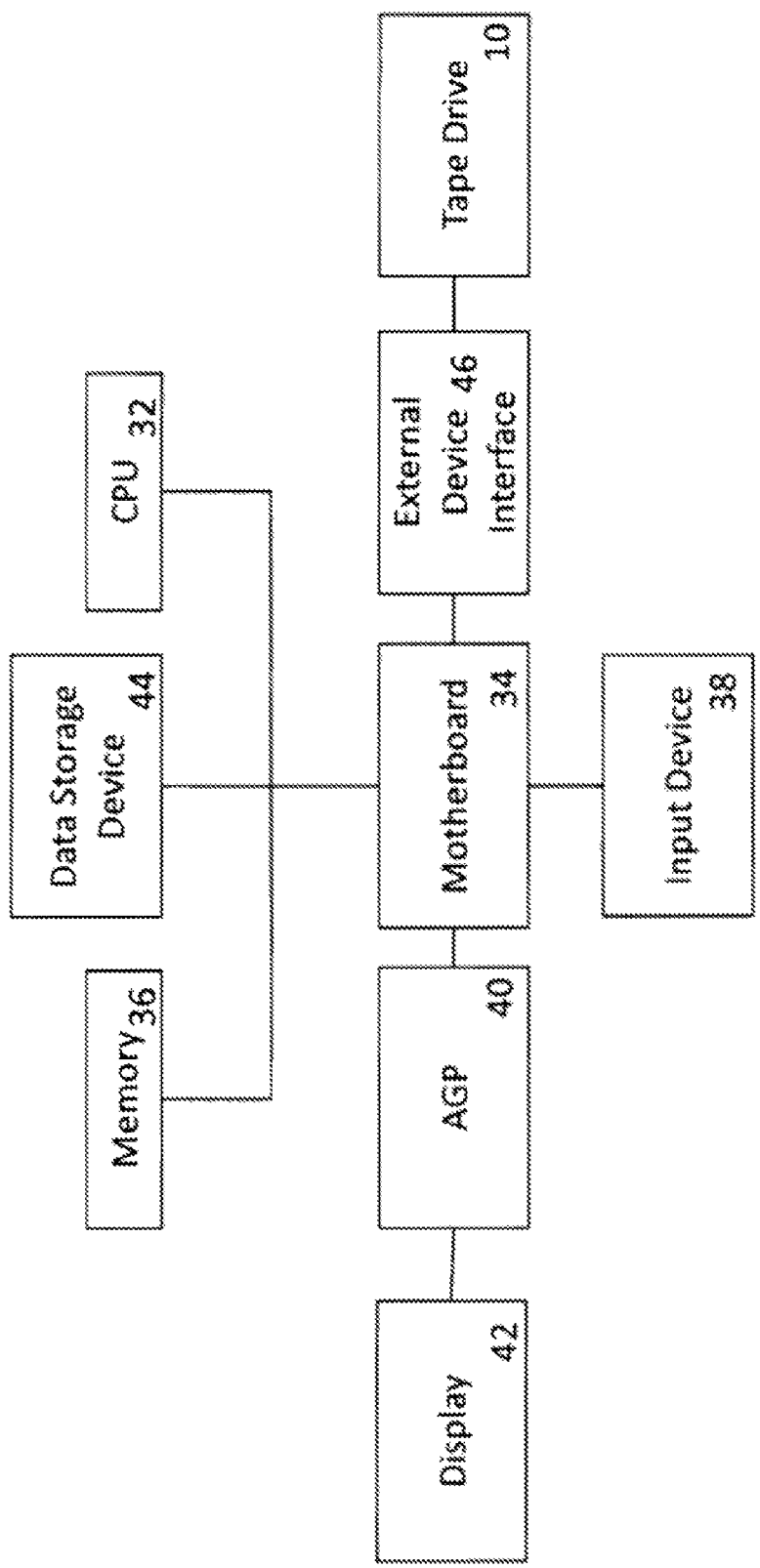
FIG. 3 is a schematic block diagram of a computer system according to an example.

FIG. 3 is a schematic block diagram of a computer system 30 having a tape drive 10 according to an example. The tape drive 10 may be mounted within a computer chassis or mounted externally. System 30 may include processors or central processing units ("CPUs") 32. While the CPU 32 will be referred to primarily in the singular, it will be understood that a computer system 30 with any number of physical or logical CPUs 32 may be implemented. The CPU 32 may be communicatively coupled to a motherboard 34 of the computer system 30. The motherboard 16 can control the routing of signals and instructions within the system 30.

The motherboard 34 may be communicatively coupled to a memory device 36 (e.g., dynamic random access memory ("DRAM"), basic input/output system ("BIOS"), read-only memory ("ROM"), etc.). A memory device 36 may store code or machine readable instructions for setting up or configuring the operation of the computer system 30. In addition, a variety of human input devices 38, such as a keyboard and/or a mouse, may be communicatively coupled to the motherboard 34. The motherboard 34 may also be communicatively coupled to a graphical interface, such as an accelerated graphics port ("AGP") 40. For example, the AGP 40 can transmit graphical data through a video card to a video display 42, which can display graphical data for a user.

The motherboard 34 may also be communicatively coupled to a data storage device 44, which may include any one of a variety of suitable data storage devices. For example, the data storage device 44 can be an Integrated Drive Electronics (IDE) or Advanced Technology Attachment (ATA) hard drive. Alternatively, the data storage device 44 may be a small computer system interface ("SCSI") drive or a fibre channel drive. Alternatively, the data storage device 44 may be a solid state data storage device or optical data storage device for example.

The motherboard 34 may be communicatively coupled to an external device interface 46, which may be any suitable form of computer interface. For example, the external device interface 46 may be a Peripheral Components Interconnect ("PCI") interface, a PCI-X interface, a PCI Express interface, a Fibre channel interface, a fibre optic interface, a Small Computer System Interface ("SCSI"), an Ethernet interface, a Universal Serial Bus ("USB") interface, a Firewire interface, a Fibre-SCSI interface, a Serial Advance Technology Attachment ("SATA") interface, a Serial Attached SCSI ("SAS") interface, and so forth. The interface 46 may include ports, a wireless connection, a cabled connection, a network interface card (NIC), and so on. The interface 46 may be communicatively coupled to external devices, such as a storage device, a network interface, and so forth. The computer system 30 may be connected to a network, such as an Ethernet network, a Gigabit network, a wireless network, and so forth.

In the example of FIG. 3, the tape drive 10 is communicatively coupled to the external device interface 46. However, in alternate examples, the tape drive 10 may be connected elsewhere in the computer system 30. For example, the tape drive 10 may be coupled directly to a motherboard 34 (or bridge, etc.) or coupled to the motherboard 34 via a dedicated card or interface, for example.

Lastly, it should be noted that the example of the computer system 30 illustrated in FIG. 3 is merely one example of the computer system 30. For example, the system 30 may include thin client systems, distributed computer systems, servers, personal digital assistants, and/or wireless telephones. As such, in alternate example, the above described elements may be reconfigured and/or certain elements omitted from the computer system 30. In another example, the memory 36 and/or the external device interface 46 may be coupled directly to the CPU 32. Moreover, additional components may be included in the computer system 30.

Figure 4:
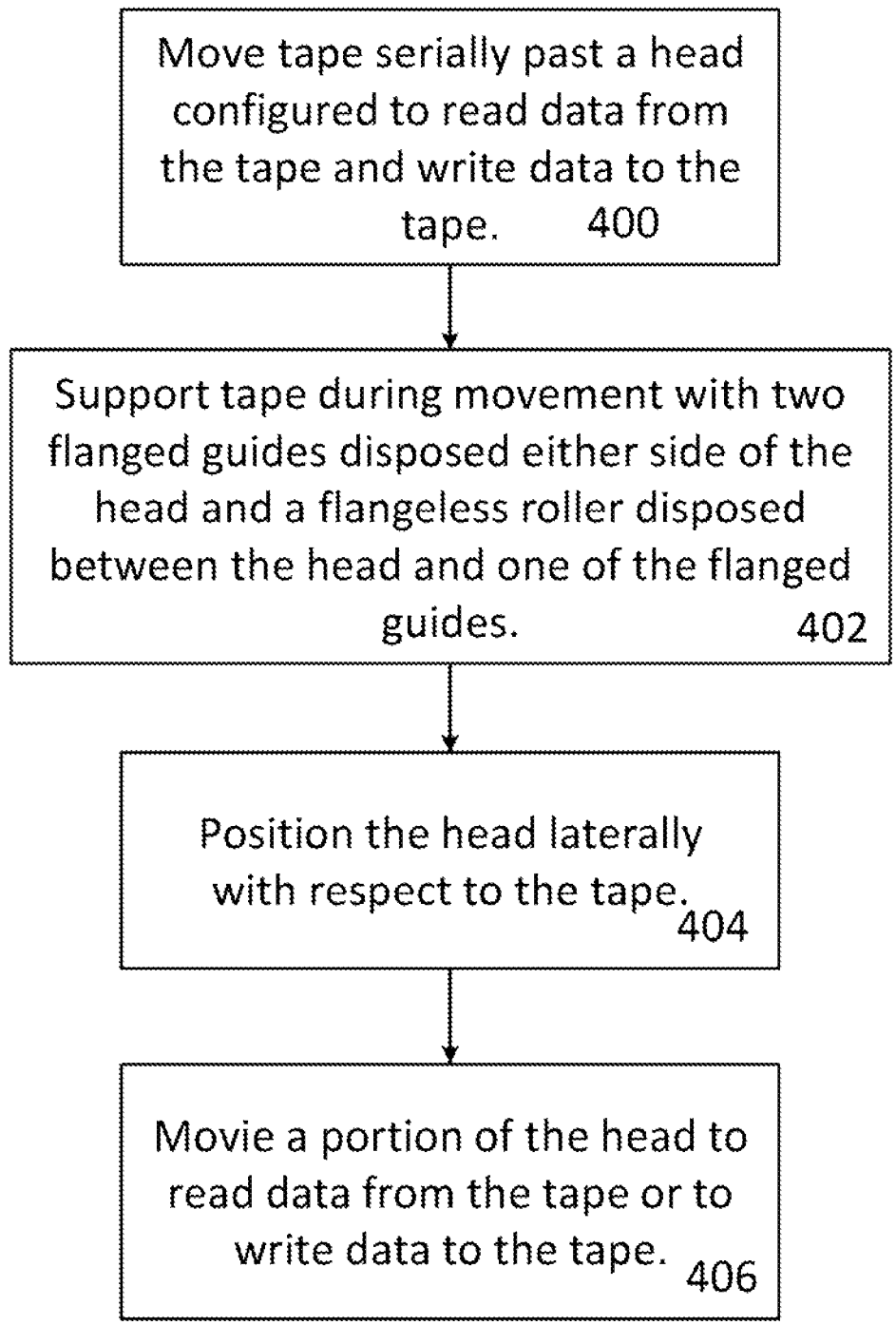
FIG. 4 is a flowchart of a method according to an example.

FIG. 4 is a flowchart of a method according to an example. In block 400 a tape 12 moved serially past a head 20 configured to read data from the tape 12 and write data to the tape 12. In block 402 the tape 12 is supported during movement with two flanged guides 18, 22 disposed either side of the head 20 and a flangeless roller 30 disposed between the head 20 and one of the flanged guides 18, 22. In block 404 the head 20 is positioned laterally with respect to the tape 12. In block 406 a portion of the head 20 is moved to read data from the tape 12 or to write data to the tape 12.

Figure 5:
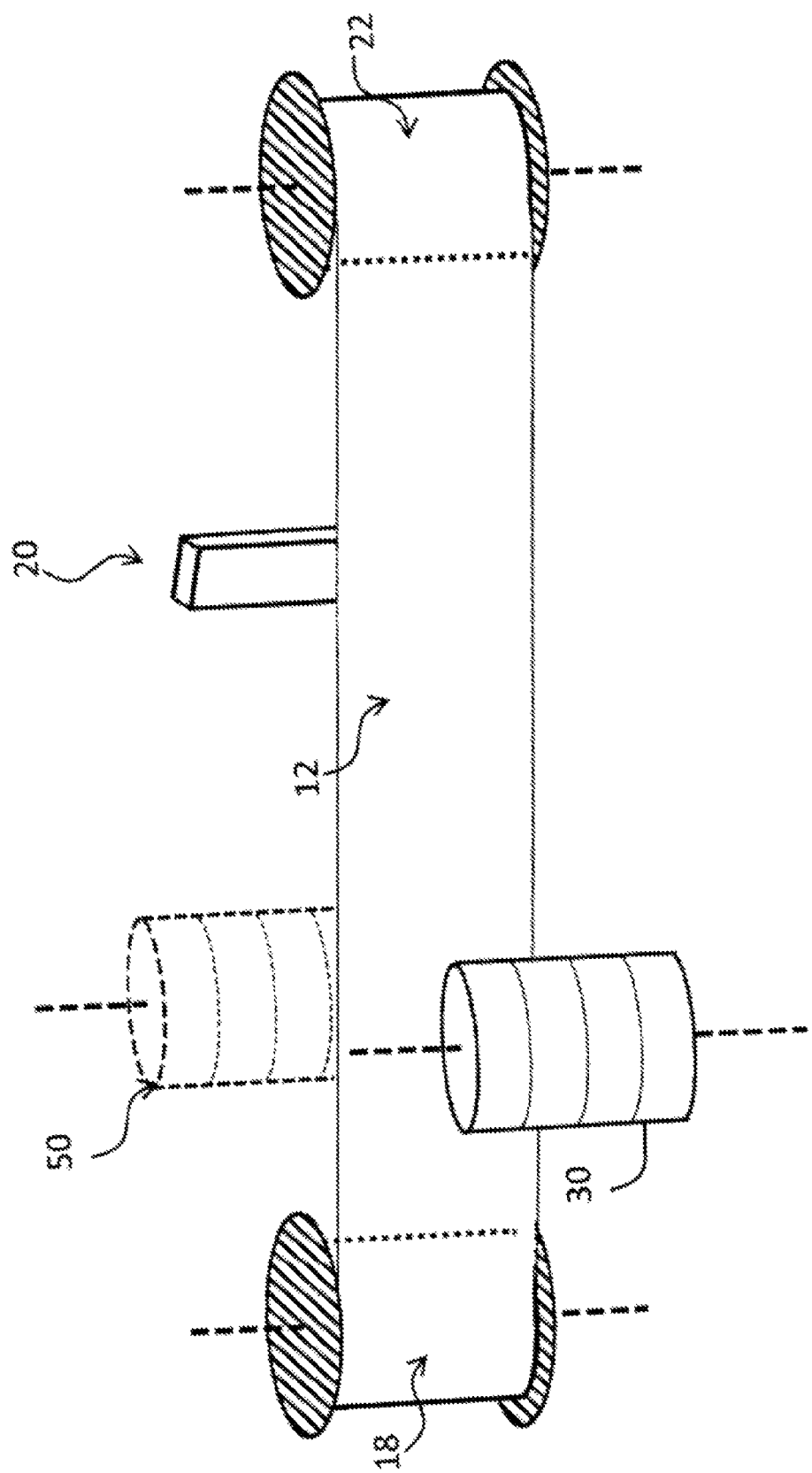
FIG. 5 is a schematic block diagram of a tape drive guide arrangement according to an example.

According to an example, roller 30 can be made moveable to act as a tape lifter to lift tape 12 away from head 20 such as when the cartridge 16 is to be ejected from drive 10 for example. Accordingly, FIG. 5 is a schematic block diagram of a tape drive guide arrangement according to such an example. Inertial roller 30 is shown in a shifted position relative to the position of the roller 50 when in use. More specifically, when the tape is desired to be lifted away from the head 20, the roller 30 in position 50 can be shifted into a second position as shown so that tape 12 is no longer incident with head 20. According to an example, the shifted inertial roller can maintain contact with the tape (with a reduced wrap angle for example), or can be moved such that the tape 12 no longer touches the inertial roller. In any case, the inertial roller is moved by an amount which is sufficient to allow the tape 12 to easily disengage from the head 20, and by an amount permitted by the constraints imposed by the physical size of the drive 10 and the disposition of elements therein for example. The amount of shift can be selected to ensure that tape 12 is clear from head 20, or that the angle of incidence of tape 12 with head 20 is reduced so as to allow the tape to be easily guided free of the head 20 (without catching, tearing etc. for example).

The shifted position of the inertial roller 30 can be an initial position of the roller when a cartridge 16 is inserted into drive 10 and before any tape 12 is taken up by the drive 10. Accordingly, after take up, the roller 30 can be translated into position 50 in order to introduce the desired wrap angle and inertia to the tape 12. The inertial roller 30 can be shifted using the motor 52 or loader 44 mechanism of the drive 10, and can be controlled using controller 58. According to an example, an inertial roller 30 can be shifted in more than one plane in order to clear tape 12 from head 20. For example, the roller 30 can be translated in one direction and shifted in a perpendicular direction—e.g. the roller 30 can be translated longitudinally and shifted laterally with respect to tape 12.

What is claimed is:

1. A tape drive comprising:
   a head configured to read data from a tape and to write data to the tape;
   a pair of flanged guide rollers arranged one on either side of the head to guide the tape longitudinally over the head; and
   a flangeless inertial roller arranged between a flanged guide roller and the head to add inertia to the tape so as to limit speed and movement of the tape as it passes over the head, wherein the flangeless inertial roller is movable laterally against the tape to engage the tape with the head.

2. A tape drive as claimed in claim 1, wherein the flangeless inertial roller includes multiple circumferential grooves to reduce an air bearing between the inertial roller and the tape.

3. A tape drive as claimed in claim 1, wherein the flangeless inertial roller includes a spiral groove arranged on a surface thereof to reduce an air bearing between the inertial roller and the tape.

4. A tape drive as claimed in claim 1, wherein a wrap-angle between the tape and the inertial roller is selected to maintain contact between a portion of the tape and the inertial roller.

5. A tape drive as claimed in claim 1, wherein the inertial roller is moveable relative to the head for lifting or releasing a portion of the tape from the head.

6. A method of operating a tape drive, comprising:
   moving a tape past a head configured to read data from the tape and write data to the tape;
   supporting the tape during movement with two flanged guides disposed either side of the head and a flangeless roller disposed between the head and one of the flanged guides;
   positioning the head laterally with respect to the tape, wherein the positioning comprises moving the flangeless roller against the tape to engage the tape with the head; and
   moving a portion of the head to read data from the tape or to write data to the tape.

7. A method as claimed in claim 6, wherein the flangeless roller includes a circumferential groove extending around a portion of the periphery of the inertial roller to maintain contact between the tape and the inertial roller.

8. A method as claimed in claim 6, wherein a cumulative angular contact of the tape against the inertial roller is provided.

9. A method as claimed in claim 8, wherein the cumulative angular contact is tuned to ensure that the tape fits in a tape path of the drive.

10. A method as claimed in claim 8, wherein the cumulative angular contact is adjusted to frequencies of movement of the tape which are to be damped.

11. A method as claimed in claim 6, further comprising:
    moving he inertial roller relative to the head to disengage the tape from the head.

12. A method as claimed in claim 11, wherein to disengage the tape from the head includes reducing an angle of incidence of the tape with the head.

13. A computer system, comprising:
    a processor; and
    a tape drive controlled using the processor and comprising a head assembly comprising:
    a head configured to read data from a tape and to write data to the tape;
    first and second guide rollers disposed on either side of the head to support the tape; and
    a flangeless roller disposed adjacent to a guide roller and the head to damp undesired lateral and longitudinal motions of the tape, wherein the flangeless roller is movable laterally against the tape to engage the tape with the head.

14. A computer system as claimed in claim 13, the flangeless roller further including a groove on a periphery thereof to reduce an air bearing between the tape and the flangeless roller.

15. A computer system as claimed in claim 13, the flangeless roller further including surface features to reduce an air bearing between the tape and the flangeless roller.

16. A tape drive as claimed in claim 1, wherein the flangeless inertial roller is movable longitudinally and laterally with respect to the tape.

17. A tape drive as claimed in claim 1, further comprising a controller for adjusting a cumulative wrap angular contact of the tape against the flangeless inertial roller to damp particular frequencies of movement of the tape.

* * * * *

UNITED STATES PATENT AND TRADEMARK OFFICE
CERTIFICATE OF CORRECTION

PATENT NO. : 8,432,640 B2  
APPLICATION NO. : 12/968602  
DATED : April 30, 2013  
INVENTOR(S) : Donald Fasen et al.

Page 1 of 1

It is certified that error appears in the above-identified patent and that said Letters Patent is hereby corrected as shown below:

In the Claims:

In column 6, line 27, in Claim 11, after "moving" delete "he" and insert -- the --, therefor.

Signed and Sealed this  
Sixth Day of August, 2013

Teresa Stanek Rea  
*Acting Director of the United States Patent and Trademark Office*